March 3, 1970     D. DEWAR     3,498,418
MULTI-PLATE DISC BRAKE AND DISC SPACING MEANS
Filed May 13, 1968
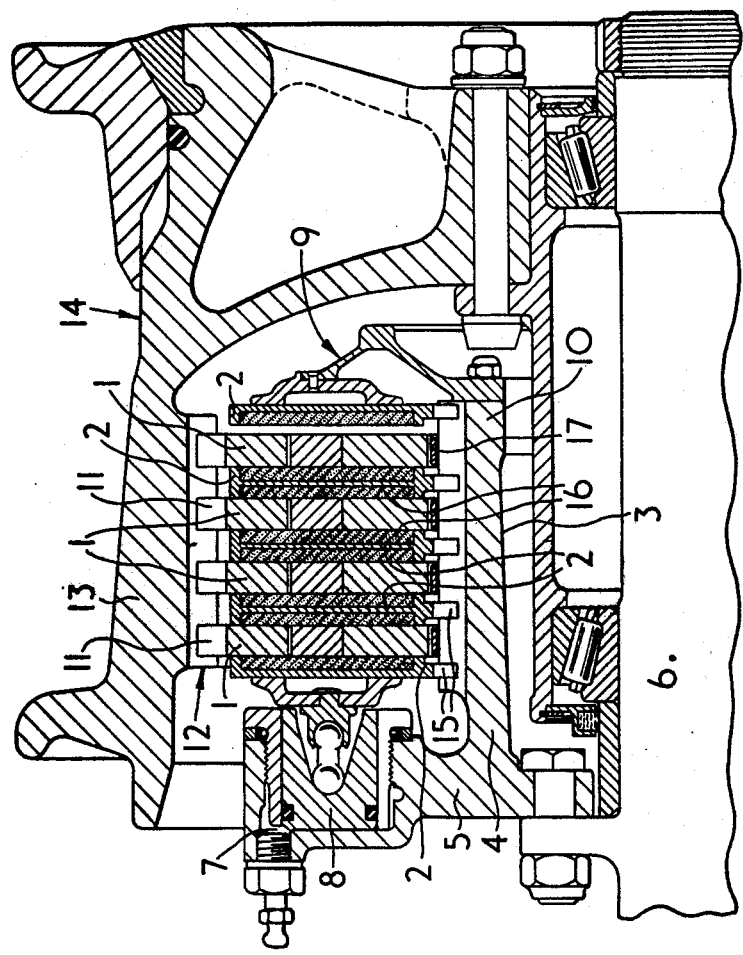

United States Patent Office 3,498,418
Patented Mar. 3, 1970

3,498,418
MULTI-PLATE DISC BRAKE AND DISC SPACING MEANS
Douglas Dewar, Stretton-on-Dunsmore, near Rugby, England, assignor to The Dunlop Company Limited, Birmingham, England, a corporation of Great Britain
Filed May 13, 1968, Ser. No. 728,590
Claims priority, application Great Britain, May 18, 1967, 23,114/67
Int. Cl. F16d 55/40
U.S. Cl. 188—72
2 Claims

ABSTRACT OF THE DISCLOSURE

A disc brake of the multi-plate type having rotor discs formed from separate ring segments, annular spacing members being arranged around the torque tube between the torque tube and the rotor discs.

---

This invention relates to disc brakes of the multi-plate kind comprising a plurality of annular friction discs arranged coaxially, alternate discs being keyed respectively to a rotatable member and a nonrotatable member and means being provided for compressing the discs together axially to produce frictional engagement between the discs. One kind of multi-plate brake incorporates friction discs formed from a plurality of separate ring segments, each segment being held in assembly with the other segments by disconnectible interlocking means which link together the adjacent end portions of the successive segments in such a manner that they are able to move axially relative to one another. Such a brake is described in the specification of our U.S. Patent No. 3,105,575.

One object of the present invention is to provide means for limiting the distortion in a direction radially inwardly of brake discs of the kind described above.

According to the invention, a disc brake of the kind described comprises a plurality of annular rotor brake discs arranged to be keyed at their outer peripheries to a wheel so as to be rotatable thereby, the rotor discs being interleaved coaxially with stator discs mounted on and nonrotatably keyed to a nonrotatable torque tube, each rotor disc being formed from a plurality of separate ring segments, each segment being held in assembly with the other segments by disconnectible interlocking means which link together the adjacent end portions of the successive segments in such a manner that they are able to move axially relative to one another, the rotor discs being fitted loosely around the torque tube and spacing members being provided one for each rotor disc, each spacing member comprising an annular member being a loose fit axially between adjacent stator discs in all states of wear of the stator and rotor discs and being a loose fit radially between the torque tube and the rotor disc.

The spacing members may take the form of cylindrical steel tubes the lengths of which are shorter than the axial length of the rotor segments.

One embodiment of the invention will now be described, by way of example with reference to the accompanying drawing which shows an axial cross-sectional view of part of a wheel incorporating a disc brake according to the invention.

A multi-plate disc brake for an aircraft wheel is described and illustrated in the specification of British Patent No. 931,031. In this brake a plurality of interleaved rotor 1 and stator 2 discs are mounted coaxially on a torque tube 3 formed integrally at one end 4 with a torque member 5 secured to a nonrotatable axle 6 of the aircraft. The torque member 5 houses a number of hydraulic cylinders 7 and pistons 8 arranged to press the discs axially towards a reaction member 9 secured at the other end 10 of the torque tube 3. The rotor discs 1 are provided with driving dogs 11 on their outer peripheries for engagement with corresponding axial keyways 12 formed in the rim 13 of an associated wheel 14, while the stator discs 2 are splined at their inner peripheries 15 to the torque tube 3.

The rotor discs 1 are each made up from eight identical annular steel segments which each have an extension at one end with a rounded head and a recess at the other end to receive the head of the extension formed on an adjacent segment, the segments being linked together in this manner to form an annular disc. This rotor construction is described and illustrated in detail in the specification of British Patent No. 931,031. The stator discs 2 are of similar construction except that they are provided on each side with sintered-on friction pads 16 for engagement with the rotors 1.

The dimensions of the rotor discs 1 are such that they fit loosely around the torque tube 3. Spacing members in the form of cylindrical steel tubes 17 the lengths of which are shorter than the axial lengths of the rotor discs 1 are fitted loosely within the inner peripheries of the rotor discs 1 and are arranged also to fit loosely around the torque tube 3.

It has been found that as a result of thermal shock during service the segments of the rotor brake discs in a brake of the kind described above may be distorted and caused to project radially inwardly to such an extent that they foul the torque tube. The interposition of steel tubes as described above effectively prevents fouling from taking place and ensures satisfactory operation of the brake.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention and it is intended that such revisions and adaptations will be included within the scope of the invention.

Having now described my invention, what I claim is:

1. A disc brake comprising a plurality of annular rotor brake discs having keys at their outer peripheries forming drivable connections with a wheel so as to be rotatable thereby, a plurality of stator discs interleafed coaxially with said rotor discs and having keys forming nonrotatable connections which provide for axial slidable movement, a nonrotatable torque tube providing a mounting for said stator discs, each rotor disc being formed from a plurality of separate ring segments, each such segment including disconnectable interlocking means which link together the adjacent end portions of successive segments in such manner that each is moveable axially relatively to the adjoining ring segment, said rotor disc being fitted loosely around said torque tube, and cylindrical spacing members provided one for each rotor disc and proportioned to be disposed radially between a respective one of said rotor discs and said torque tube to be engageable by the radially inner periphery of a respective one of said rotor discs, each spacing member being proportioned to be of less axial dimension than the axial dimension of the rotor disc to provide a loose fit between adjacent stator discs in all states of wear of the stator and rotor discs and thereby unengageable by said stator discs during a brake application to preclude axial distortion of said spacing members, to maintain a substantially loose fit radially between said torque tube and the associated rotor disc.

2. A disc brake according to claim 1 wherein the cylindrical spacing members are of steel composition.

References Cited

UNITED STATES PATENTS

| | | |
|---|---|---|
| 795,207 | 7/1905 | Eastwood. |
| 2,217,357 | 10/1940 | Coe _____ 192—70.28 |
| 3,105,575 | 10/1963 | Dewar et al. _____ 188—218 |
| 3,171,522 | 3/1965 | Petrie et al. _____ 188—216 X |

GEORGE E. A. HALVOSA, Primary Examiner

U.S. Cl. X.R.

192—70.11